No. 688,800.  
F. W. STEUER.  
TURRET HEAD FOR MONITOR LATHES.  
(Application filed Mar. 13, 1901.)  
Patented Dec. 10, 1901.
(No Model.)
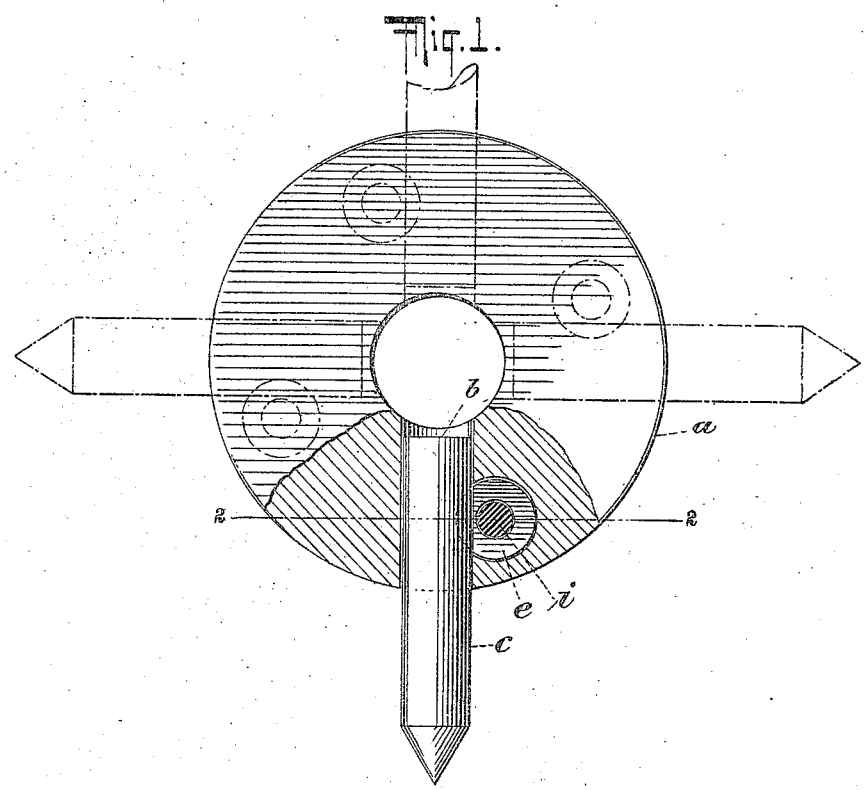
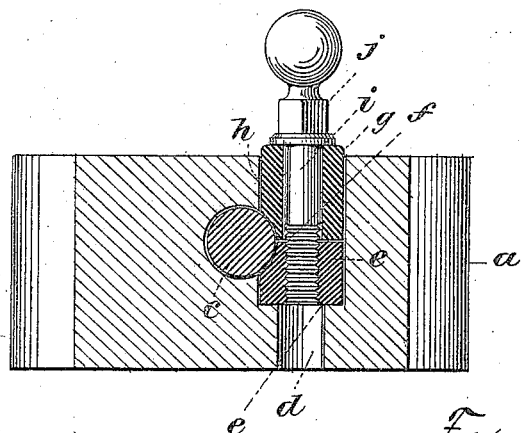
WITNESSES:
INVENTOR  
Frederick W. Steuer  
BY Briesen &Knauth  
ATTORNEYS

UNITED STATES PATENT OFFICE.

FREDERICH W. STEUER, OF BROOKLYN, NEW YORK, ASSIGNOR OF ONE-HALF TO CHARLES J. TAGLIABUE, OF BROOKLYN, NEW YORK.

TURRET-HEAD FOR MONITOR-LATHES.

SPECIFICATION forming part of Letters Patent No. 688,800, dated December 10, 1901.

Application filed March 13, 1901. Serial No. 50,971. (No model.)

*To all whom it may concern:*

Be it known that I, FREDERICH W. STEUER, a subject of the King of Denmark, residing in the borough of Brooklyn, county of Kings, city and State of New York, have invented certain new and useful Improvements in Turret-Heads for Monitor-Lathes, of which the following is a specification.

My invention relates to turret-heads for monitor-lathes, and has for its special object to improve the construction of tool-holders therefor, so that in case of breakage the tool-holding parts may be replaced with a minimum of trouble and little loss of time.

In the accompanying drawings I have shown a structure in which my invention is embodied.

In the drawings, Figure 1 is a plan view, partly broken away, showing a turret-head of a lathe in which my invention is embodied; and Fig. 2 is a section thereof on line 1 1 of Fig. 1.

The turret-head $a$ is shown in its simplest form, carrying one tool, which is shown in full lines. This turret-head is rigidly secured upon the lathe and is adapted to be rotated to bring the other tools, whose positions are indicated in dotted lines, into the working position. (Shown in full lines in Fig. 1.)

The invention will now be described with reference to a single tool; but it will be understood that a number of tools are carried upon each head.

The turret-head is bored with a passage $b$ for the reception of a tool $c$, which passage is intersected by a bore or passage $d$ for the reception of the tool-engaging elements. Seated loosely or friction-tight in the bore or passage $d$ is a threaded sleeve $e$, having a jaw $f$. Coöperating with the sleeve $e$ is another sleeve $g$, having a jaw $h$. This sleeve $g$ is likewise loose in the bore or passage $d$. The jaws $f\,h$ come on either side of the tool $c$ and are adapted to grip the same, the gripping being effected by the action of the screw-bolt $i$, which passes freely through the loose sleeve $g$ and is tapped into the loose threaded sleeve $e$. Turning the bolt-head $j$ will cause the jaws to firmly grip the tool. The fastening is very secure, and in case of breakage of any of the tool-engaging elements they may be replaced at once without loss of time. For instance, should the screw-bolt break off the sleeve $g$ may be lifted out of the bore $d$, the tool removed from the bore $c$, and the loose sleeve $e$, carrying the broken piece of bolt, removed. The broken bolt may be replaced by another and another sleeve $e$ used, or the same sleeve may be restored after screwing out the piece of broken bolt.

The advantages of my improved structure will be obvious to those skilled in the art.

Having described my invention, what I claim, and desire to secure by Letters Patent, is—

1. A tool-holding device comprising the rigid body having intersecting bores or passages formed therein, one of said bores being a tool-receiving bore and the other a passage for the tool-receiving means, means for securing the tool in place, which means comprise a plurality of freely-removable tool-engaging elements that are adapted to engage the tool at the intersection of the passages.

2. A tool-holder comprising a turret-head, intersecting passages formed therein, one of said passages being adapted to receive a tool, a plurality of freely-movable tool-engaging sleeves seated in the other passage and adapted to engage the tool at the intersection of the passages and means for causing the sleeves to grip the tool.

FREDERICH W. STEUER.

Witnesses:
GEO. E. MORSE,
OTTO V. SCHRENK.